(12) United States Patent
Schneider

(10) Patent No.: US 8,757,696 B2
(45) Date of Patent: Jun. 24, 2014

(54) VEHICLE ENCLOSURE AND METHOD AND SYSTEM OF INSTALLATION

(75) Inventor: Eric R. Schneider, Tampa, FL (US)

(73) Assignee: Nivel Holdings, LLC, Jacksonville, FL (US)

( * ) Notice: Subject to any disclaimer, the term of this patent is extended or adjusted under 35 U.S.C. 154(b) by 169 days.

(21) Appl. No.: 13/156,372

(22) Filed: Jun. 9, 2011

(65) Prior Publication Data

US 2012/0311825 A1 Dec. 13, 2012

(51) Int. Cl.
*B60J 1/00* (2006.01)

(52) U.S. Cl.
USPC .......................................................... 296/79

(58) Field of Classification Search
USPC ............... 296/79, 100.14, 141, 145, 77.1, 83; 135/88.1; 206/315.3, 315.6; 248/96; 224/274; 150/160, 159, 166; 280/33.992

See application file for complete search history.

(56) References Cited

U.S. PATENT DOCUMENTS

| | | | |
|---|---|---|---|
| 1,242,108 A | 10/1917 | Buob, Sr. | |
| 1,562,190 A * | 11/1925 | Reiter | 24/671 |
| 2,789,863 A * | 4/1957 | Shimabukuro | 296/77.1 |
| 3,135,820 A * | 6/1964 | Hallett, Jr. et al. | 174/5 R |
| 3,534,446 A * | 10/1970 | Silver | 24/114.9 |
| 3,689,962 A * | 9/1972 | Erickson | 24/108 |
| 3,709,553 A * | 1/1973 | Churchill et al. | 296/145 |
| 3,784,235 A | 1/1974 | Kessler et al. | |
| 3,834,756 A * | 9/1974 | Grell | 296/136.1 |
| 3,851,357 A | 12/1974 | Ribich et al. | |
| 4,013,315 A * | 3/1977 | West | 296/83 |
| D245,838 S * | 9/1977 | Messinger | D12/402 |
| 4,098,536 A * | 7/1978 | Mills | 296/77.1 |
| 4,654,934 A | 4/1987 | Hasegawa | |
| 4,773,694 A * | 9/1988 | Gerber | 296/77.1 |
| D301,567 S * | 6/1989 | Burke | D11/220 |
| 5,014,400 A | 5/1991 | Ban | |
| 5,119,278 A * | 6/1992 | Watson | 362/485 |
| D332,437 S * | 1/1993 | Lay, Jr. | D12/405 |
| 5,217,275 A * | 6/1993 | Ridge | 296/77.1 |
| D350,501 S * | 9/1994 | Schriever | D11/220 |
| 5,429,404 A | 7/1995 | King, Sr. | |
| 5,588,690 A * | 12/1996 | Showalter | 296/77.1 |
| 5,788,317 A * | 8/1998 | Nation | 296/141 |
| D410,412 S * | 6/1999 | Tominaga et al. | D11/220 |
| 6,132,089 A | 10/2000 | Galomb et al. | |
| 6,439,637 B1 * | 8/2002 | Tyrer | 296/79 |
| D466,439 S * | 12/2002 | Wagner et al. | D11/220 |
| D473,158 S * | 4/2003 | Matsui et al. | D11/220 |
| D473,820 S * | 4/2003 | Ming | D11/220 |
| D477,246 S * | 7/2003 | Takeda | D11/220 |

(Continued)

FOREIGN PATENT DOCUMENTS

EP 2263491 12/2010

*Primary Examiner* — Kiran B Patel
(74) *Attorney, Agent, or Firm* — Weiss & Arons LLP

(57) ABSTRACT

A vehicle enclosure (14) and method and system of installation using an adhesive-backed attachment device (1) having a base (4) with an adhesive backing (10) and a stud (12) or a socket (2) that engages a conventional a conventional snap (8). The adhesive-backed attachment device is preferably flexible so that it may be attached to uneven surfaces of a vehicle, such as a golf cart (15). The adhesive-backed attachment device eliminates unsightly brackets, drilling or screwing into the golf cart and cuts down on installation time of golf cart enclosures. The studs and sockets may also be integrated into a new roof (14) for retrofitting an existing golf cart.

6 Claims, 3 Drawing Sheets

(56) References Cited

U.S. PATENT DOCUMENTS

| | | |
|---|---|---|
| RE38,272 E | 10/2003 | Nation |
| D481,654 S * | 11/2003 | Matsui et al. .............. D11/220 |
| 6,916,059 B2 * | 7/2005 | Feinberg ..................... 296/79 |
| 6,979,044 B2 | 12/2005 | Tyrer |
| 7,210,492 B2 | 5/2007 | Gerrie et al. |
| 7,213,864 B2 * | 5/2007 | Gasper ........................ 296/83 |
| D557,191 S | 12/2007 | Curtis, Jr. et al. |
| 7,354,092 B2 * | 4/2008 | Showalter et al. ......... 296/77.1 |
| D595,743 S * | 7/2009 | Neumann .................... D15/17 |
| 7,560,003 B2 | 7/2009 | Naughton et al. |
| 7,740,300 B2 * | 6/2010 | Marsh et al. ................. 296/83 |
| D626,451 S | 11/2010 | Helwig et al. |
| D626,452 S | 11/2010 | Helwig et al. |
| 7,832,788 B2 * | 11/2010 | Marsh et al. .............. 296/146.1 |
| 7,854,463 B1 * | 12/2010 | Neumann ..................... 296/83 |
| 2002/0145302 A1 * | 10/2002 | Winkler ..................... 296/77.1 |
| 2002/0167192 A1 * | 11/2002 | Tyrer et al. ............. 296/100.11 |
| 2005/0093331 A1 * | 5/2005 | Moskos et al. ............... 296/102 |
| 2006/0071044 A1 * | 4/2006 | Stanfield et al. ............. 224/274 |
| 2006/0125279 A1 * | 6/2006 | Tyrer ...................... 296/100.14 |
| 2006/0169864 A1 * | 8/2006 | Salerno ....................... 248/500 |
| 2008/0281180 A1 * | 11/2008 | Choe et al. .................. 600/391 |
| 2011/0001330 A1 * | 1/2011 | Hirneise ..................... 296/77.1 |
| 2011/0233957 A1 * | 9/2011 | Sams ............................ 296/79 |

* cited by examiner

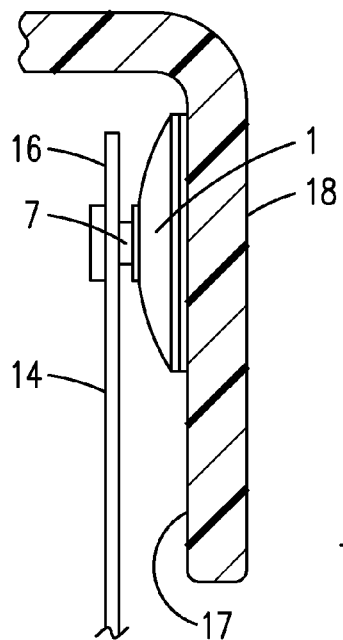
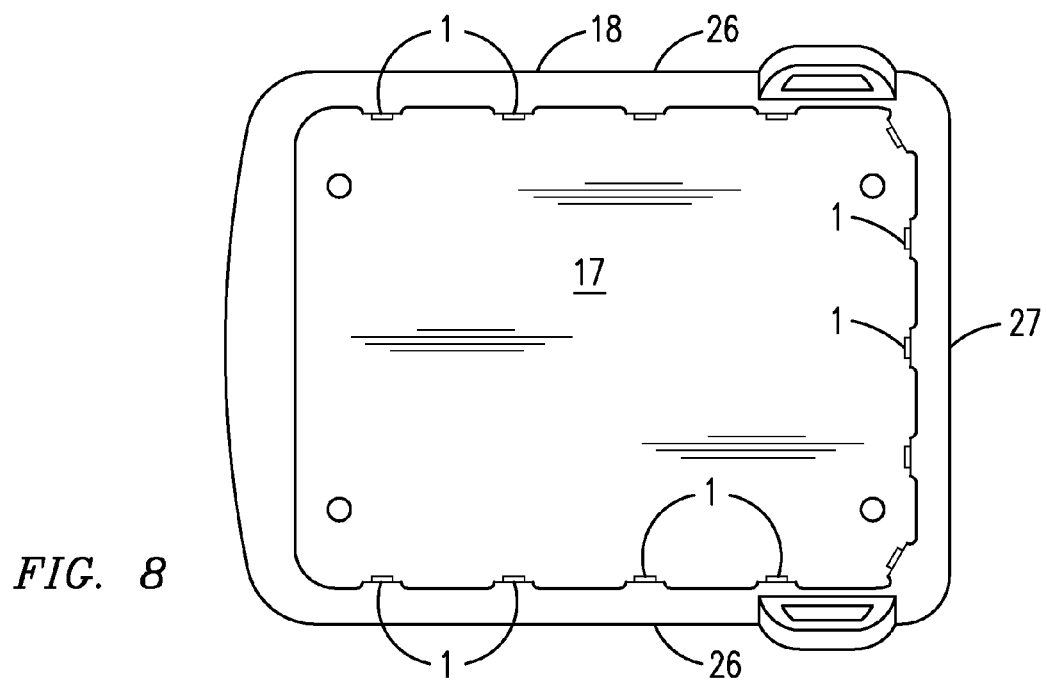
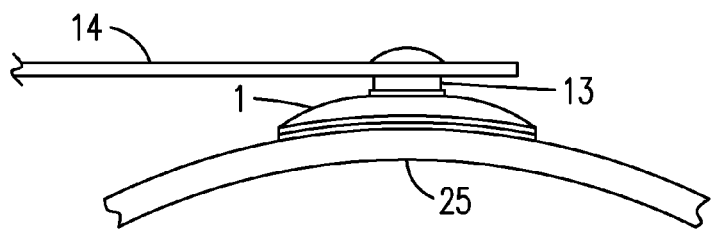

VEHICLE ENCLOSURE AND METHOD AND SYSTEM OF INSTALLATION

BACKGROUND OF THE INVENTION

This invention relates to enclosures for vehicles, and more particularly to an enclosure having an adhesive-backed fastener that is used in conjunction with conventional snaps for quickly and easily installing the enclosure on a vehicle.

Conventional enclosures, such as enclosures for golf carts, are attached to golf carts using a combination of hook and loop fasteners and/or snaps. Conventional snaps require an installer to drill holes into the structure of the golf cart in order to attach each snap to the golf cart with a screw. Tracks having C-shaped channels are also commonly used to attach an upper edge of a golf cart enclosure to a roof of a golf cart. A golf cart enclosure is attached to the track by sliding a cord sewn into the upper edge of the golf cart enclosure into the C-shaped channel. The tracks are attached to the roof using screws or nuts and bolts. This requires designing the brackets so screw holes on the brackets line up with existing screw holes on the roof. Installation of the tracks is time consuming and costly because it often requires some dismantling of the roof and the roof support structure to gain access to existing screw holes to install the C-shaped channels (usually expensive aluminum). Furthermore, conventional installations wherein holes are drilled into any portion of a golf cart will void most golf cart manufacturers' warranties.

Therefore, a need exists for a vehicle enclosure and method of installation that will allow a user to quickly install and secure the enclosure to a vehicle without having to drill any holes into the vehicle or use brackets to attach the enclosure to the roof of a golf cart.

The relevant prior art includes the following references:

| Pat. No. | Inventor | Issue/Publication Date |
|---|---|---|
| (U.S. Patent References) | | |
| D626,452 | Helwig et al. | Nov. 02, 2010 |
| D626,451 | Helwig et al. | Nov. 02, 2010 |
| 7,560,003 | Naughton et al. | Jul. 14, 2009 |
| D557,191 | Curtis, Jr. et al. | Dec. 11, 2007 |
| 7,213,864 | Gasper | May 08, 2007 |
| 7,210,492 | Gerrie et al. | May 01, 2007 |
| 6,979,044 | Tyrer | Dec. 27, 2005 |
| 6,916,059 | Feinberg | Jul. 12, 2005 |
| RE38,272 | Nation | Oct. 14, 2003 |
| 6,439,637 | Tyrer | Aug. 27, 2002 |
| 6,132,089 | Galomb et al. | Oct. 17, 2000 |
| 5,429,404 | King, Sr. | Jul. 04, 1995 |
| 5,014,400 | Ban | May 14, 1991 |
| 4,654,934 | Hasegawa | Apr. 07, 1987 |
| 3,851,357 | Ribich et al. | Dec. 03, 1974 |
| 3,784,235 | Kessler et al. | Jan. 08, 1974 |
| 3,709,553 | Churchill et al. | Jan. 09, 1973 |
| 1,242,108 | Buob, Sr. | Oct. 02, 1917 |
| (Foreign Patent References) | | |
| EP2263491 | Hayashi | Oct. 22, 2010 |

SUMMARY OF THE INVENTION

The primary object of the present invention is to provide a vehicle enclosure and method of installation that will allow a user to quickly install and secure the enclosure to a vehicle without having to drill any holes into the vehicle.

Another object of the present invention is to provide a vehicle enclosure and method of installation that will allow a user to quickly install and secure the enclosure to a vehicle without having to use brackets to attach the enclosure to the roof of the vehicle.

The present invention fulfills the above and other objects by providing an enclosure and method of installation comprising an enclosure having a plurality of adhesive-backed attachment devices, each having a stud or a socket that engages a conventional stud or a conventional socket of a conventional snap. The adhesive-backed attachment devices are preferably flexible so that the adhesive-backed attachment devices may be attached to uneven surfaces of a vehicle, such as rounded fenders or curved roofs of a golf cart. The adhesive-backed attachment devices eliminate unsightly brackets and decreases installation time of the enclosure. For example, an installer installing an enclosure having conventional studs and/or conventional sockets secured to the outer perimeter of the enclosure can attach adhesive-backed attachment devices to each conventional snap and conventional stud. Then, the installer can simply peel a protective layer off a rear surface of each adhesive-backed attachment device, thereby exposing an adhesive layer, and attach one-by-one each adhesive-backed attachment device to a vehicle, such as a golf cart. The installer can start on one corner of an upper edge of the enclosure and simply move along the upper edge peeling and sticking each adhesive-backed attachment device to the appropriate spot of the roof of the golf cart and then to the body of the golf cart. The studs and sockets may also be integrated into the vehicle, such as a new golf cart or into a new roof for retrofitting an existing golf cart.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which:

FIG. 6 is a partial cross-section view along line 6-6 of FIG. 5 of a vehicle enclosure of the present invention secured to a golf cart roof;

FIG. 7 is a cutaway side view of a vehicle enclosure of the present invention attached to a curved surface using a conventional socket and a flexible adhesive-backed attachment device;

FIG. 8 is a bottom view of an inner surface of a golf cart roof having adhesive-backed attachment devices integrated therein;

DESCRIPTION OF THE PREFERRED EMBODIMENTS

Figure 1:
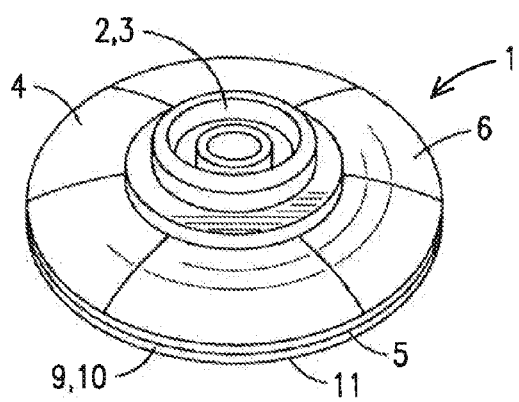
FIG. 1 is a top perspective view of an adhesive-backed attachment device of the present invention having a socket as an engagement means.

For purposes of describing the preferred embodiment, the terminology used in reference to the numbered accessories in the drawings is as follows:

| | |
|---|---|
| 1. | adhesive-backed attachment device |
| 2. | socket |
| 3. | engagement means |
| 4. | base |
| 5. | rear surface |
| 6. | front surface |
| 7. | conventional stud |
| 8. | conventional snap |
| 9. | securing means |
| 10. | adhesive |
| 11. | peel away cover |
| 12. | stud |
| 13. | conventional socket |
| 14. | vehicle enclosure |
| 15. | golf cart |
| 16. | upper edge |
| 17. | inner surface |
| 18. | roof |
| 19. | side edge |
| 20. | outer surface |
| 21. | body |
| 22. | attachment means |
| 23. | zipper |
| 24. | sleeve |
| 25. | curved surface |
| 26. | side edge |
| 27. | rear edge |
| 28. | attaching conventional snap to enclosure |
| 29. | attaching enclosure attachment device to conventional snap |
| 30. | cleaning surface |
| 31. | securing the enclosure attachment device to surface |
| 32. | repeating previous step |
| 33. | attaching remaining portions of enclosure |
| 34. | attaching conventional snap to enclosure |
| 35. | attaching upper edge to roof |
| 36. | attaching enclosure attachment device to conventional snap |
| 37. | cleaning surface |
| 38. | securing the enclosure attachment device to surface |
| 39. | repeating previous step |
| 40. | attaching remaining portions of enclosure |

Figure 3:
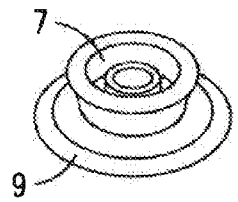
FIG. 3 is a top perspective view of a conventional stud of a conventional snap.

With reference to FIG. 1, a top perspective view of an adhesive-backed attachment device 1 of the present invention having a socket 2 as an engagement means 3 is illustrated. The adhesive-backed attachment device 1 comprises a base 4 having a rear surface 5 and a front surface 6. The socket 2 extends upward from a central location of the front surface 6 of the adhesive-backed attachment device 1. The socket 2 is attachable to a conventional stud 7 of a conventional snap 8, as illustrated in FIG. 3. A securing means 9, such as adhesive 10, is located on the rear surface 5 of the base 4 to allow a user to secure the adhesive-backed attachment device 1 to a surface, such as a golf cart. The adhesive 10 is preferably covered by a peel away cover 11. The expanded surface area provided by the larger size of the base 4 provides additional contact area between the base 4 and a surface that the adhesive-backed attachment device 1 is being secured to. The adhesive-backed attachment device 1 may be made of a rigid material, such as plastic, metal and so forth, or of a flexible material, such as rubber, silicone and so forth, to allow a user to attach the adhesive-backed attachment device 1 to a curved surface, as illustrated in FIG. 7.

Figure 2:
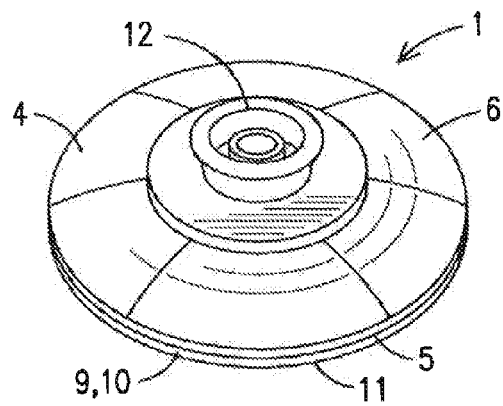
FIG. 2 is a top perspective view of an adhesive-backed attachment device of the present invention having a stud as an engagement means.
Figure 4:
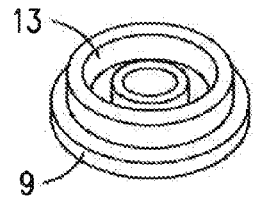
FIG. 4 is a top perspective view of a conventional socket from a conventional snap.

With reference to FIG. 2, a top perspective view of an adhesive-backed attachment device 1 of the present invention having a stud 12 as an engagement means 3 is illustrated. The adhesive-backed attachment device 1 comprises a base 4 having a rear surface 5 and a front surface 6. The stud 12 extends upward from a central location of the front surface 6 of the adhesive-backed attachment device 1. The stud 13 is attachable to a conventional socket 13 of a conventional snap 9, as illustrated in FIG. 4. A securing means 9, such as adhesive 10, is located on the rear surface 5 of the base 4 to allow a user to secure the adhesive-backed attachment device 1 to a surface, such as a golf cart. The adhesive 10 is preferably covered by a peel away cover 11.

With reference to FIG. 3, a top perspective view of a conventional stud 7 of a conventional snap 9 is illustrated.

With reference to FIG. 4, a top perspective view of a conventional socket 13 from a conventional snap 9 is illustrated.

Figure 5:
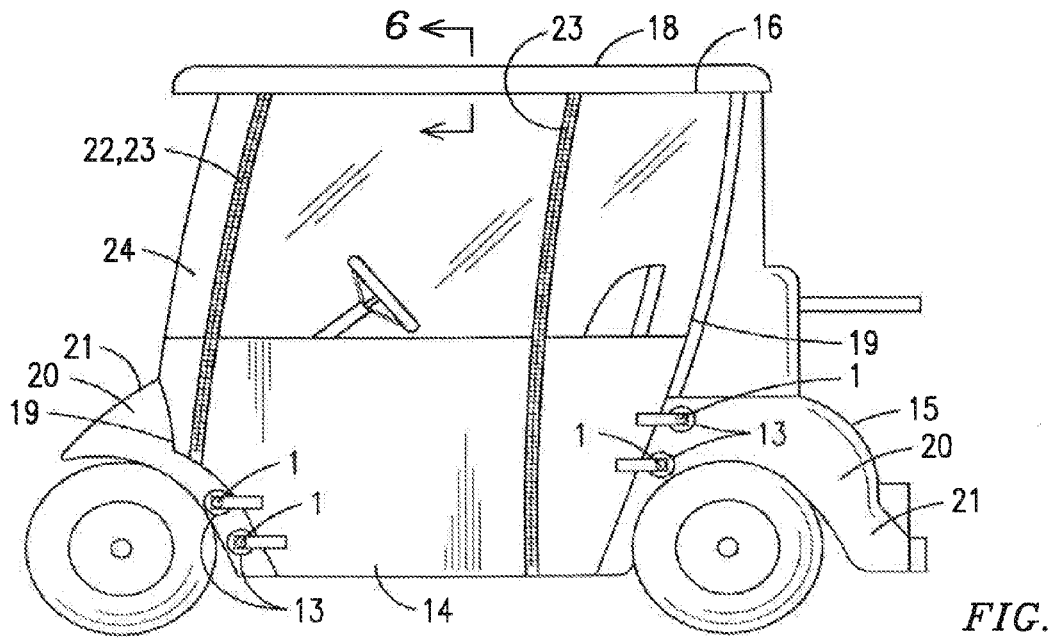
FIG. 5 is a side view of a vehicle enclosure of the present invention attached to a golf cart using adhesive-backed attachment devices.

With reference to FIG. 5, a side view of a vehicle enclosure 14 of the present invention attached to a golf cart using adhesive-backed attachment devices 1 is illustrated. An upper edge 16 of the vehicle enclosure 14 is attached to an inner surface 17 of a golf cart roof 18 using conventional studs 7 and adhesive-backed attachment devices 1, as illustrated in FIG. 6. Side edges 19 of the vehicle enclosure 14 are attached to an outer surface 20 of a body 21 of the golf cart 15 using conventional sockets 13 and adhesive-backed attachment devices 1. The vehicle enclosure 14 is also attached to the golf cart 15 using attachment means 22, such as conventional snaps 8, hook and loop fasteners, zippers 23, sleeves 24 and so forth.

With reference to FIG. 6, a partial cross-section view along line 6-6 of FIG. 5 of a vehicle enclosure 14 of the present invention secured to a golf cart roof 14 is illustrated. An upper edge 16 of the vehicle enclosure 14 is attached to an inner surface 17 of the golf cart roof 18 using conventional studs 7 and adhesive-backed attachment devices 1.

With reference to FIG. 7, a side cutaway view of a vehicle enclosure 14 of the present invention attached to a curved surface 25 using a conventional socket 13 and a flexible adhesive-backed attachment device 1 is illustrated. The flexible adhesive-backed attachment device 1 may also be user inside curves, such as an inner corner of a golf cart roof 18.

With reference to FIG. 8, a bottom view of an inner surface 17 of a golf cart roof 18 having adhesive-backed attachment devices 1 of the present invention integrated therein. The adhesive-backed attachment devices 1 are integrated into side edges 26 and a rear edge 27 of the golf cart roof 24 to allow a user to easily secure a vehicle enclosure 14 to the roof using conventional snaps 8 and without having to modify the roof 18.

Figures 9, 10:
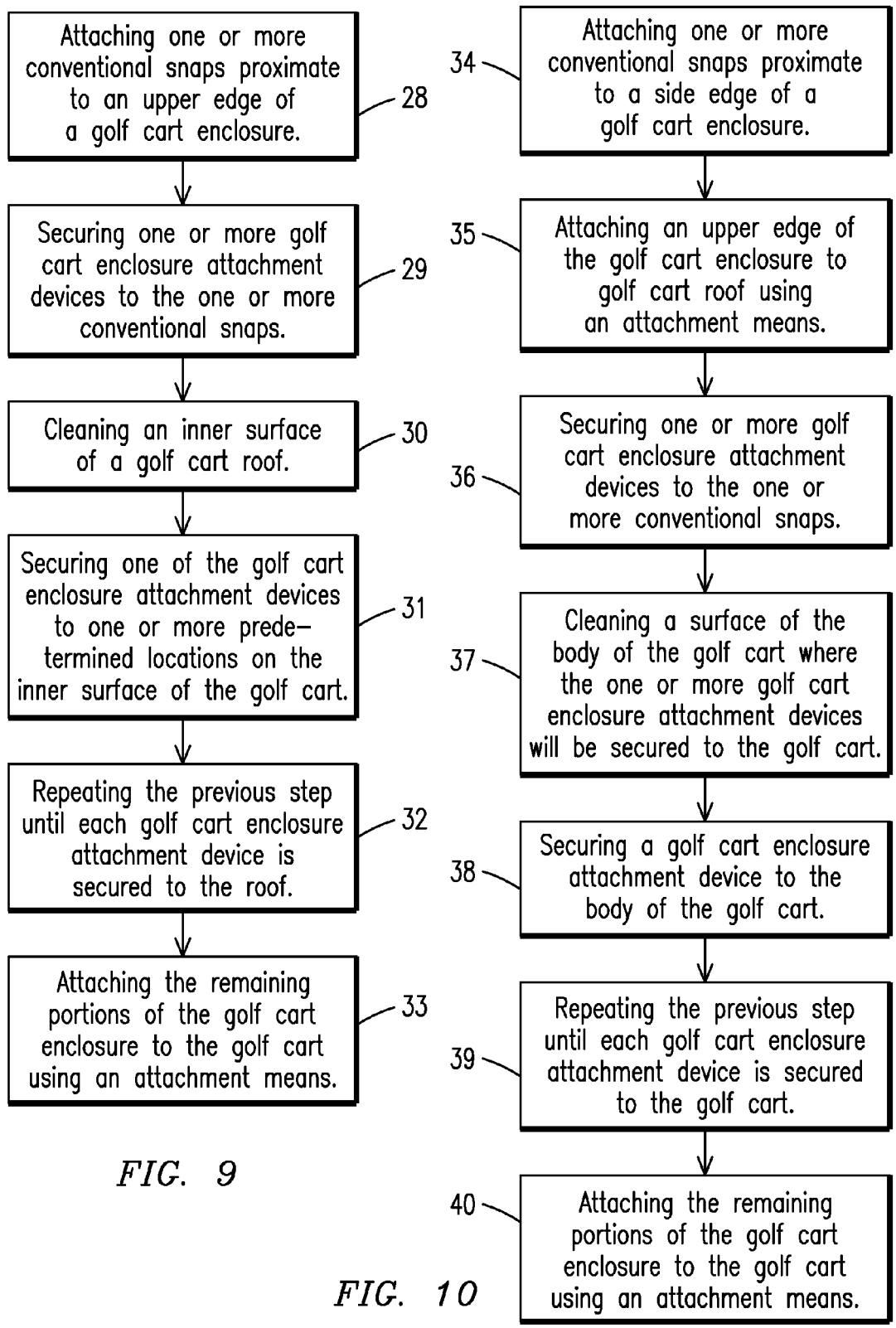
FIG. 9 is a flow chart illustrating a method of installation of a vehicle enclosure of the present invention on a roof of a golf cart.
FIG. 10 is a flow chart illustrating a method of installation of a vehicle enclosure of the present invention on a body of a golf cart.

With reference to FIG. 9, a flow chart illustrating a method of installation of a vehicle enclosure of the present invention on a roof of a golf cart is shown. First, conventional snaps are attached proximate to an upper edge of a vehicle enclosure 28. Then, adhesive-backed attachment devices are attached to the conventional snaps 29. Next, an inner surface of the roof is cleaned 30. Then, an adhesive-backed attachment device is secured to the inner surface of the roof using a securing means 31. Next, the previous step is repeated until each adhesive-backed attachment device is secured to the inner surface of the roof 32. By attaching the adhesive-backed attachment devices to the roof while the adhesive-backed attachment devices are attached to the conventional snaps and the golf cart enclosure, a user does not have to measure out attachment points on the roof and can instead eyeball the installation by starting at one corner of the vehicle enclosure and working along the upper edge of the enclosure attaching each adhesive-backed attachment device one-by-one to the roof. Finally, the remaining portions, such as side edges, bottom edges, etc., of the vehicle enclosure are attached to the golf cart using an attachment means, such as adhesive-backed fasteners of the present invention, conventional snaps, hook and loop fastener, zippers, sleeves and so forth 33.

With reference to FIG. 10, a flow chart illustrating a method of installation of a vehicle enclosure of the present invention on a body of a golf cart is shown. First, conventional snaps are attached proximate to a side edge of a vehicle enclosure 34. Then an upper edge of the vehicle enclosure is attached to a roof of the golf cart using an attachment means, such as adhesive-backed fasteners of the present invention, conventional snaps, roof cover, rails, clips and so forth 35. Next, adhesive-backed attachment devices are attached to the conventional snaps 36. Next, the surface of the golf cart body is cleaned 37. Then, one of the adhesive-backed attachment devices is attached to the body of the golf cart using a securing means 38. Next, the previous step is repeated until each adhesive-backed attachment device is attached to the surface of the body 39. Finally, any remaining unattached portions of the golf cart enclosure, such as side edges, bottom edges, etc., are attached to the golf cart using an attachment means, such as adhesive-backed fasteners of the present invention, conventional snaps, hook and loop fastener, zippers, sleeves and so forth 40.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A golf cart enclosure for use only with a golf cart, the enclosure comprising:
   an upper edge, a lower edge and two side edges;
   at least one conventional snap located on the golf cart enclosure;
   at least one secure-adhesive backed attachment device having a base, said base having a rear surface and a front surface;
   an engagement means extending upward from a central location on the front surface of the base for engaging the at least one snap;
   a securing means comprising a secure-adhesive located on the rear surface of the base for securely attaching the at least one secure-adhesive backed attachment device to a surface on the golf cart; and
   a peel away cover for protecting the secure-adhesive of the secure-adhesive backed attachment device, said peel away cover for protecting the secure-adhesive prior to affixing said device to the golf cart.

2. The golf cart enclosure of claim 1 wherein:
said engagement means is a stud for engaging a conventional socket of the conventional snap.

3. The golf cart enclosure of claim 1 wherein:
said engagement means is a socket for engaging a conventional stud of the conventional snap.

4. The golf cart enclosure of claim 1 wherein:
said at least one secure-adhesive backed attachment device for is made of a flexible material.

5. The golf cart enclosure of claim 1 wherein:
said securing means is secure-adhesive located on the rear surface of the base.

6. The golf cart enclosure of claim 1 wherein:
said base of the secure-adhesive backed attachment device has a width that is greater than a width of the engagement means.

* * * * *